United States Patent
Ogino (10) Patent No.: US 9,620,120 B2
(45) Date of Patent: Apr. 11, 2017

(54) MINUTES TAKING SYSTEM, MINUTES TAKING METHOD, AND IMAGE FORMING APPARATUS

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Noboru Ogino, Shizuoka (JP)

(73) Assignees: KABUSHIKI KAISHA TOSHIBA, Tokyo (JP); TOSHIBA TEC KABUSHIKI KAISHA, Tokyo (JP)

(*) Notice: Subject to any disclaimer, the term of this patent is extended or adjusted under 35 U.S.C. 154(b) by 18 days.

(21) Appl. No.: 14/720,044

(22) Filed: May 22, 2015

(65) Prior Publication Data

US 2016/0343374 A1 Nov. 24, 2016

(51) Int. Cl.
*G10L 15/00* (2013.01)
*G10L 15/26* (2006.01)
*H04N 1/00* (2006.01)

(52) U.S. Cl.
CPC ....... *G10L 15/265* (2013.01); *H04N 1/00403* (2013.01); *H04N 2201/0082* (2013.01)

(58) Field of Classification Search
None
See application file for complete search history.

(56) References Cited

U.S. PATENT DOCUMENTS

| | | | | |
|---|---|---|---|---|
| 5,692,225 A * | 11/1997 | Bernardi | ........... | G03B 17/24 396/310 |
| 6,754,631 B1 * | 6/2004 | Din | ........... | G10L 17/00 704/270 |
| 7,146,321 B2 * | 12/2006 | Cyr | ........... | G10L 15/34 704/231 |
| 7,573,593 B2 * | 8/2009 | Hart | ........... | H04N 1/00127 348/14.03 |
| 8,082,142 B2 * | 12/2011 | Maegawa | ........... | G10L 15/183 704/2 |

(Continued)

FOREIGN PATENT DOCUMENTS

| | | |
|---|---|---|
| JP | 2002-099530 | 4/2002 |
| JP | 2004-287201 | 10/2004 |
| JP | 4314753 | 8/2009 |

*Primary Examiner* — Marcus T Riley
(74) *Attorney, Agent, or Firm* — Amin, Turocy & Watson LLP (57) ABSTRACT

A minutes taking system includes a voice recognition apparatus and an image forming apparatus. The voice recognition apparatus receives voice signals from the image forming apparatus, performs voice recognition processing on the received voice signals, and returns voice recognition results to the image forming apparatus. The image forming apparatus includes voice input units, a storage unit, a voice transmission unit, a voice recognition result receiving unit, a minutes data creating unit, and an image forming unit. The storage unit accumulates the voice signals input from the voice input units. The voice transmission unit transmits a non-transmitted voice signal, among the voice signals stored in the storage unit, to the voice recognition apparatus when a predetermined condition is satisfied. The minutes data creating unit creates minutes data based on the voice recognition result received by the voice recognition result receiving unit.

13 Claims, 5 Drawing Sheets

(56) References Cited

U.S. PATENT DOCUMENTS

| | | | |
|---|---|---|---|
| 8,108,212 B2* | 1/2012 | Maegawa | G10L 15/07 704/231 |
| 2003/0083883 A1* | 5/2003 | Cyr | G10L 15/30 704/270.1 |
| 2004/0034529 A1* | 2/2004 | Hooper, III | B41J 3/44 704/260 |
| 2008/0228480 A1* | 9/2008 | Maegawa | G10L 15/07 704/235 |
| 2009/0070102 A1* | 3/2009 | Maegawa | G10L 15/183 704/9 |

* cited by examiner

| USER ID | CENTER FREQUENCY | AUTHENTICATION INFORMATION |
|---|---|---|
| CARD ID | f1 | PASSWORD a |
| E-MAIL ADDRESS | f2 | PASSWORD b |
| LOGIN ID | f3 | PASSWORD c |
| ATTRIBUTE INFORMATION | f4 | PASSWORD d |

FIG. 6

MINUTES TAKING SYSTEM, MINUTES TAKING METHOD, AND IMAGE FORMING APPARATUS

FIELD

Embodiments described herein relate generally to a minutes taking system, a minutes taking method, and an image forming apparatus.

BACKGROUND

In the related art, in an example, minutes of a meeting or the like are taken by a recording secretary catching and writing the details of the meeting. In addition, in another example, minutes of a meeting or the like are taken by writing the details of the meeting after the meeting based on voices recorded during the meeting. However, these minutes taking examples may be troublesome.

DETAILED DESCRIPTION

A minutes taking system includes a voice recognition apparatus and an image forming apparatus. The voice recognition apparatus receives voice signals from the image forming apparatus, performs voice recognition processing on the received voice signals, and returns voice recognition results to the image forming apparatus. The image forming apparatus includes voice input units, a storage unit, a voice transmission unit, a voice recognition result receiving unit, a minutes data creating unit, and an image forming unit. The voice input units input voice signals. The storage unit accumulates the voice signals input from the voice input units. The voice transmission unit transmits a non-transmitted voice signal, among the voice signals stored in the storage unit, to the voice recognition apparatus when a predetermined condition is satisfied. The voice recognition result receiving unit receives the voice recognition results returned by the voice recognition apparatus. The minutes data creating unit creates minutes data based on the voice recognition result received by the voice recognition result receiving unit. The image forming unit forms an image, which represents details of minutes, on a sheet based on the minutes data created by the minutes data creating unit.

Hereinafter, the minutes taking system according to the embodiment will be described with reference to the drawings. In each drawing, like components are represented by like reference numerals.

Figure 1:
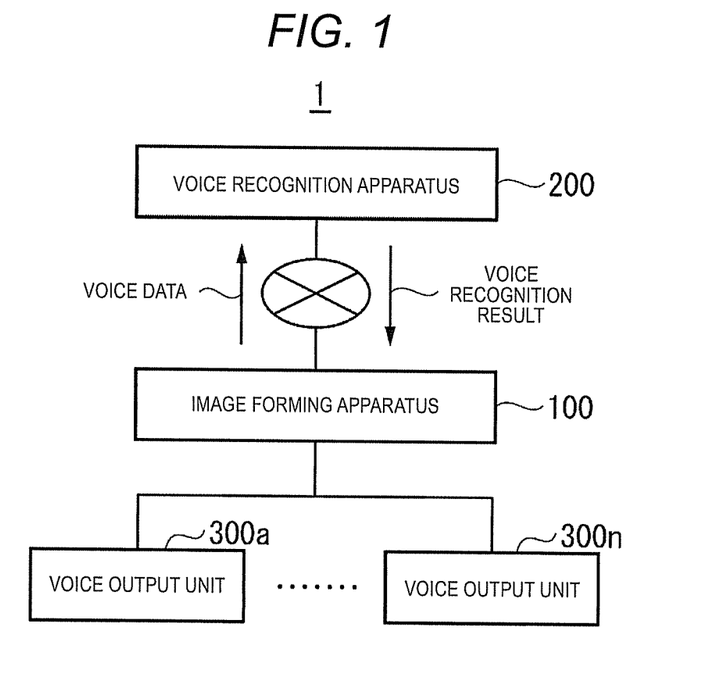
FIG. 1 is a block diagram showing a minutes taking system according to an embodiment.

FIG. 1 is a block diagram showing the minutes taking system according to the embodiment. The minutes taking system includes an image forming apparatus 100, a voice recognition apparatus 200, and plural voice output units 300*a* to 300*n*. When it is not necessary to distinguish the voice output units 300*a* to 300*n* from each other, the voice output units 300*a* to 300*n* will be referred to as "voice output units 300".

The image forming apparatus 100 is a multi function peripheral (MFP). The image forming apparatus 1 forms an image on a sheet using a recording agent based on image data. Specific examples of the recording agent include toner.

The image forming apparatus 100 is connected with the plural voice output units 300 through an internal network. Examples of the internal network include a local area network (LAN). The image forming apparatus 100 transmits voice data to the plural voice output units 300, respectively.

The image forming apparatus 100 can be connected with the voice recognition apparatus 200 through an external network. The external network is a network using a public communication line. Examples of the external network include the Internet. The image forming apparatus 100 transmits voice data to the voice recognition apparatus 200. The image forming apparatus 100 receives voice recognition results transmitted from the voice recognition apparatus 200. The voice recognition results are returned as a response to the voice data.

The voice input units 300 are microphones connected to the internal network. The voice input units 300 input voices of attendees in a meeting to create voice signals. The voice output units 300 transmit voice data, which is digital data converted from the voice signals, to the internal network. For example, the voice input units 300 are personal computers equipped with a microphone. For example, the personal computer equipped with a microphone is provided per attendee.

The voice recognition apparatus 200 performs voice recognition processing, that is, performs morphological analysis on the voice data supplied from the outside to create voice recognition results. The voice recognition results are character data representing the details of the voices. The voice recognition apparatus 200 returns the created voice recognition results to the image forming apparatus 100 which is a transmission source of the voice data. For example, the voice recognition apparatus 200 is a service site which performs the voice recognition processing as a Web service.

The voice recognition apparatus 200 may specify a dictionary having feature values used for voice recognition based on the attendees of the meeting. The voice recognition apparatus 200 registers a dictionary having feature values in association with information of the attendees using the minutes taking system.

Figure 2:
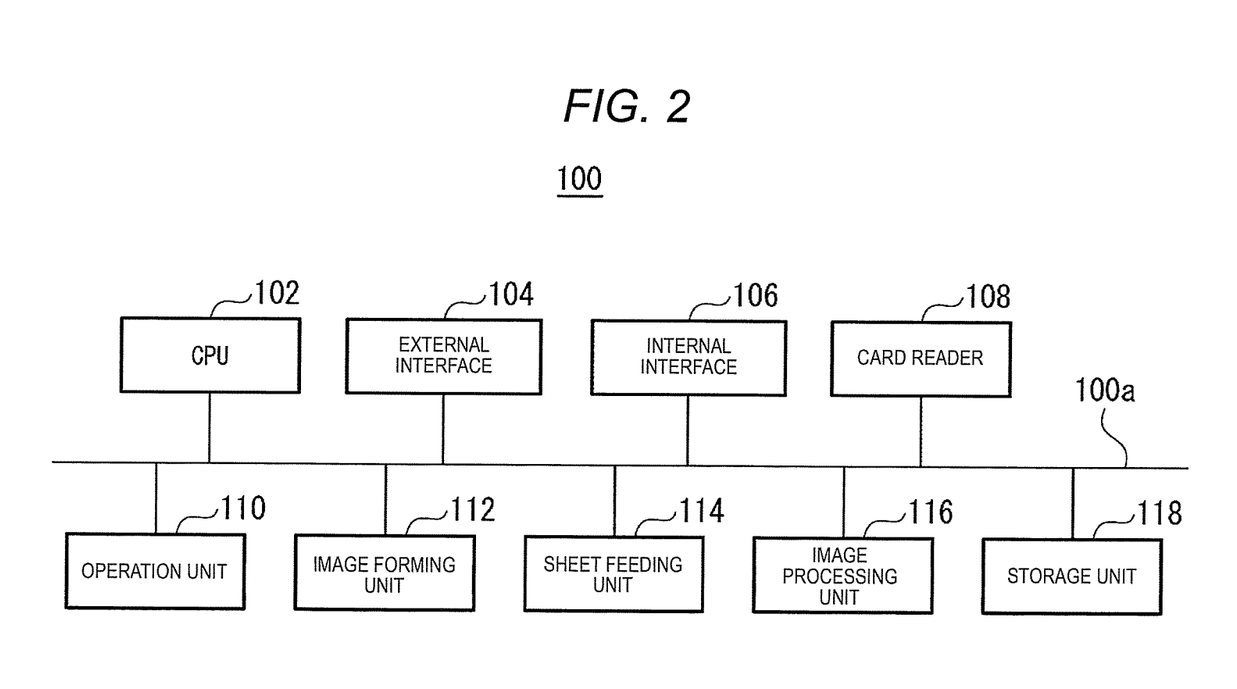
FIG. 2 is a block diagram showing an example of a configuration of an image forming apparatus in the minutes taking system according to the embodiment.

FIG. 2 is a block diagram showing an example of a configuration of the image forming apparatus 100 in the minutes taking system according to the embodiment. The image forming apparatus 100 includes a central processing unit (CPU) 102, an external interface 104, and an internal interface 106. In addition, the image forming apparatus 100 further includes a card reader 108, an operation unit 110, an image forming unit 112, a sheet feeding unit 114, an image processing unit 116, and a storage unit 118. Each functional unit included in the image forming apparatus 100 is connected to an internal bus 100*a* so as to exchange data.

The CPU 102 controls overall operations of the image forming apparatus 100. The function of the image forming apparatus 100 controlling the overall operations may be realized by a software function unit which executes a program stored in the storage unit 118. In addition, the function of the image forming apparatus 100 controlling the overall operations may be realized by a hardware function unit such as a large scale integration (LSI) or an application specific integrated circuit (ASIC).

The operation unit 110 functions as a user interface. The operation unit 110 includes a display device and an input device. Examples of the display device include a liquid crystal display and an organic electroluminescence (EL) display. In addition, examples of the input device include a keyboard and a touch panel. The operation unit 110 receives an instruction to perform an operation of the image forming apparatus 100 through the input device. Specific examples of the instruction to perform an operation include designation of an operation mode of the image forming apparatus 100. Examples of the operation mode of the image forming apparatus 100 include a minutes taking mode. In the minutes taking mode, minutes are printed based on the voice data input from the voice output units 300.

The sheet feeding unit 114 feeds a sheet for printing to the image forming unit 112. The sheet feeding unit 114 performs a sheet feeding operation according to a printing instruction of the CPU 102. The image forming unit 112 performs a printing operation of forming an image on the sheet fed by the sheet feeding unit 114. The image forming unit 112 starts the printing operation according to the printing instruction of the CPU 102. The image forming unit 112 forms an image on the sheet based on image data created by the image processing unit 116.

The internal interface 106 establishes a communication connection between the plural voice input units 300 through the internal network. The voice data created by the voice input units 300 is supplied to the internal interface 106.

The external interface 104 establishes a communication connection with the voice recognition apparatus 200 through the external network. In a state where the communication connection is established, the external interface 104 functions as a voice transmission unit that transmits the voice data to the voice recognition apparatus 200. The external interface 104 receives the voice recognition results which are transmitted by the voice recognition apparatus 200 as a response to the reception of the voice data. As a result, the external interface 104 functions as a voice recognition result receiving unit.

The card reader 108 reads information stored in a card-like recording medium possessed by a user of the image forming apparatus 100. Examples of the card reader 108 include an IC card reader or a magnetic card reader and the like. The card reader 108 delivers the read information to the CPU 102. The information delivered by the card reader 108 is processed by the CPU 102 as user authentication information.

The image processing unit 116 creates image data to be printed by the image forming unit 112. Under the control of the CPU 102, the image processing unit 116 creates image data so as to print minutes containing the plural voice recognition results input through the external interface 104. Examples of the image processing unit 116 include a raster image processor (RIP) engine.

The storage unit 118 includes various recording mediums. For example, the storage unit 118 may be a non-volatile memory such as a hard disc drive (HDD), a flash memory, or a electrically erasable programmable read only memory (EEPROM). In addition, the storage unit 118 includes a random access memory (RAM). Further, the storage unit 118 stores various programs such as firmware or application programs, the voice data, and the voice recognition results.

Figure 3:
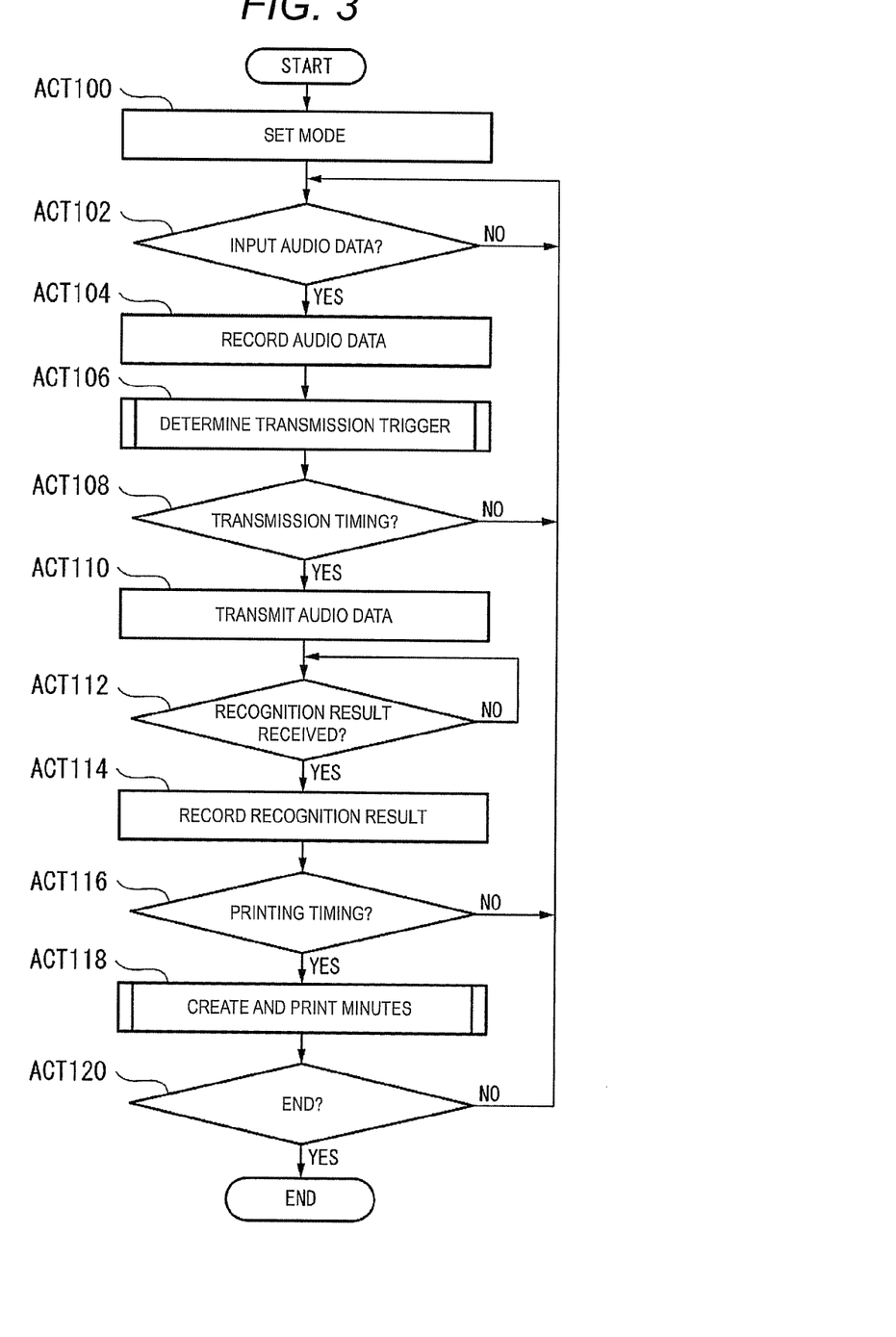
FIG. 3 is a flowchart showing an example of overall operations in the image forming apparatus according to the embodiment.

FIG. 3 is a flowchart showing an example of the overall operations in the image forming apparatus 100 according to the embodiment.

The CPU 102 sets the operation mode to a minutes taking mode when the operation unit 110 is manipulated (ACT 100). In addition, when the minutes taking mode is set, the CPU 102 sets a channel used for taking minutes among the voice input units 300, a telephone line, and binary audio information. The binary audio information may be data received through a network or external input data of a portable recording medium or the like. The CPU 102 waits for an input of the voice data. When the voice data is input (ACT 102: YES), the CPU 102 stores the voice data on the storage unit 118 (ACT 104).

The voice input unit 300 creates and transmits the voice data while a voice having a predetermined intensity is detected.

The CPU 102 determines whether a transmission trigger of the voice data is created (ACT 106).

Figure 4:
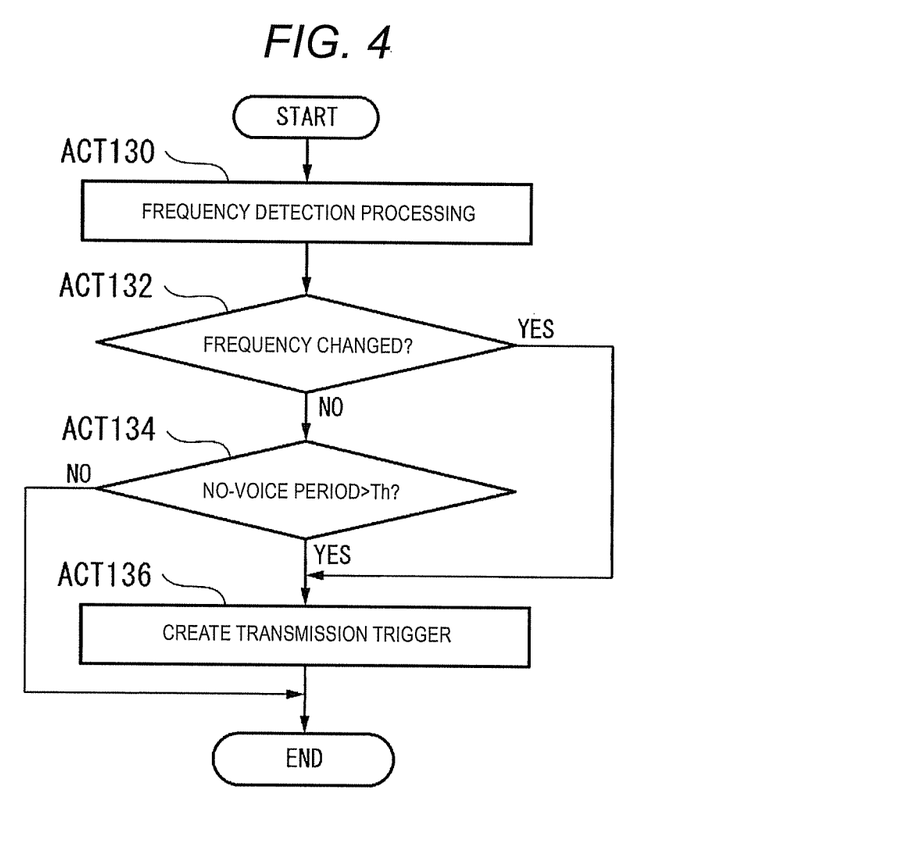
FIG. 4 is a flowchart showing an example of a determination operation of a transmission trigger in the image forming apparatus according to the embodiment.

FIG. 4 is a flowchart showing an example of a determination operation of a transmission trigger in the image forming apparatus 100 according to the embodiment. The CPU 102 performs frequency detection processing, that is, analyzes the intensity of each frequency component contained in the voice data which is stored in the storage unit 118 (ACT 130). The CPU 102 determined whether or not center frequencies of voices are changed based on the result of the frequency detection processing (ACT 132). The CPU 102 compares a center frequency obtained at a first timing to a center frequency obtained at a second timing subsequent to the first timing. The CPU 102 determines whether or not both the center frequencies are separated by more than a predetermined width. When both the center frequencies are separated by more than the predetermined width, the CPU 102 determines that the center frequencies are changed. When it is determined that the center frequencies are changed (ACT 132: YES), the CPU 102 creates a transmission trigger (ACT 136). When it is determined that the center frequencies are not changed (ACT 132: NO), the CPU 102 proceeds to ACT 134.

The CPU 102 determines whether or not a no-voice period exceeds a threshold Th (ACT 134). For example, the threshold may be an arbitrary value or may be set as a value of several seconds. The CPU 102 counts a count value when it is detected that the no-voice period, during which the voice data contains no voices of the attendees, is started. When the count value exceeds the threshold Th (ACT 134: YES), the CPU 102 creates a transmission trigger (ACT 136). When a voice is detected before the count value exceeds the threshold Th (ACT 134: NO), the CPU 102 clears the count value and ends the process.

The determination operation of a transmission trigger is as described above. The description returns to FIG. 3.

The CPU 102 determines whether or not the transmission trigger is created based on the result of the determination result (ACT 106) of the transmission trigger (ACT 108). When it is determined that the transmission trigger is created, the CPU 102 determines that a transmission timing is reached (ACT 108: YES). When it is determined that the transmission trigger is not created, the CPU 102 determines that a transmission timing is not reached (ACT 108: NO).

The CPU 102 extracts non-transmitted voice data from the voice data stored in the storage unit 118 and transmits the extracted voice data to the voice recognition apparatus 200 (ACT 110). The non-transmitted voice data is voice data which is stored and received by the internal interface 106 after the previous determination of the transmission timing and the previous transmission of the voice data. The non-transmitted voice data is processing unit data of the voice recognition processing in the voice recognition apparatus 200.

The CPU 102 waits for the reception of the voice recognition results transmitted by the voice recognition apparatus 200 (ACT 112). When the voice recognition results are received by the external interface 104 (ACT 112: YES), the CPU 102 stores the voice recognition results in the storage unit 118 (ACT 114). The received voice recognition result is a voice recognition result corresponding to one non-transmitted voice data. The received voice recognition result is processing unit data of a process of taking minutes.

The CPU 102 determines whether or not a printing timing of minutes is reached (ACT 116). When the data volume of the voice recognition results stored in the storage unit 118 in ACT 114 exceeds a predetermined value, the CPU 102 may determine that the printing timing is reached. The CPU 102 may determine that the printing timing is reached when the operation unit 110 is manipulated to instruct printing. When it is determined that the printing timing is reached (ACT 116: YES), the CPU 102 proceeds to ACT 118. When it is determined that the printing timing is not reached (ACT 116: NO), the CPU 102 proceeds to ACT 102.

The CPU 102 creates minutes data (ACT 118). The CPU 102 controls the image forming unit 112 to print minutes based on the created minutes data (ACT 118).

Figure 5:
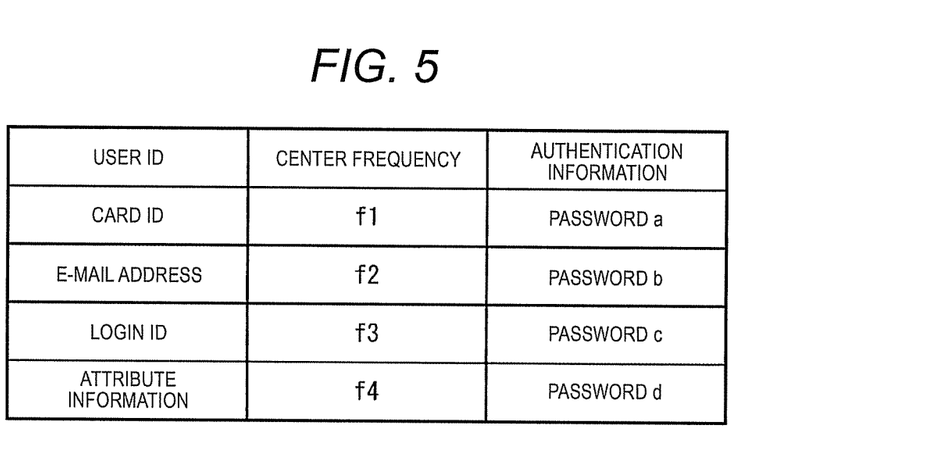
FIG. 5 is a diagram showing an example of table data in the image forming apparatus according to the embodiment.

FIG. 5 is a diagram showing an example of table data in the image forming apparatus 100 according to the embodiment. In the table data, a center frequency and authentication information are coupled with a user ID. The CPU 102 functions as an identification information registering unit which registers the user ID in the table data as the identification information. The user ID is the identification information of an attendee. Examples of the user ID include a card ID, an e-mail address, a login ID, and attribute information. The attribute information is information representing the attribute of an attendee. Examples of the attribute information include a position and a role in a meeting. The card ID is acquired from the card reader 108. For example, when the voice input unit 300 is a personal computer, the e-mail address, the login ID, or the attribute information is acquired from the internal interface 106. The authentication information is information for determining whether or not to authorize the use of the image forming apparatus 100. Examples of the authentication information include an e-mail password and a login password.

The CPU 102 refers to the table data shown in FIG. 5. The CPU 102 couples the voice recognition results with user IDs based on the center frequencies detected by the frequency detection processing (ACT 130). For example, the CPU 102 adds a user ID to each voice recognition result to be stored in the storage unit 118.

Figure 6:
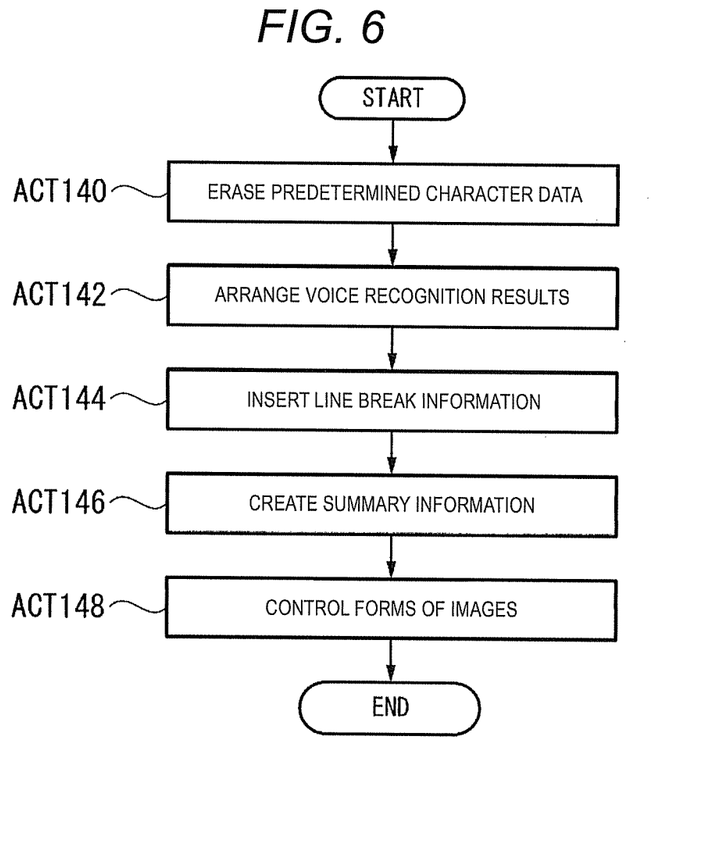
FIG. 6 is a flowchart showing an example of a creation operation of minutes data in the image forming apparatus according to the embodiment.

FIG. 6 is a flowchart showing an example of a creation operation of minutes data in the image forming apparatus 100 according to the embodiment.

The CPU 102 erases predetermined character data from character data contained in the voice recognition results which are stored in the storage unit 118 (ACT 140). The CPU 102 stores the predetermined character data in the storage unit 118 in advance. Examples of the predetermined character string include a character string corresponding to an agreeable response "uh-huh". In addition, for example, when it is determined that a voice "off the record" is input, the CPU 102 erases a voice recognition result corresponding to the voice and the subsequent voice recognition results. Further, when a voice recognition result representing arbitrary character data is contained, the CPU 102 may erase the voice recognition result. As a result, when a voice recognition result containing a predetermined character string is present, the CPU 102 excludes the voice recognition result containing the predetermined character string from the minutes data.

The CPU 102 arranges the voice recognition results in chronological order (ACT 142). As described above, the CPU 102 transmits non-transmitted voice data and receives a voice recognition result thereof at each transmission timing. Accordingly, the CPU 102 arranges the voice recognition results in order of reception.

The CPU 102 creates the minutes data in which line break information is inserted between the arranged voice recognition results (ACT 144). The line break information is control information that causes the printing of character data to end at a position where character data of the voice recognition result ends in the image processing unit 116. In addition, the line break information causes character data of a new voice recognition result to be printed at the next line.

The CPU 102 extracts a selected voice recognition result from the plural voice recognition results to create summary information (ACT 146). The CPU 102 determines whether or not a voice recognition result containing selected information is present in the voice recognition results. For example, the CPU 102 displays character data of the voice recognition results on the display device of the operation unit 110. The CPU 102 displays a check box for each character data. The CPU 102 adds selected information to each character data as a summary when the check box is manipulated. As a result, the CPU 102 extracts a voice recognition result containing the selected information from the character data to create summary information.

The CPU 102 controls forms of images based on the user IDs coupled with the voice recognition results (ACT 148). The CPU 102 changes colors, fonts, or character sizes of images corresponding to the voice recognition results based on the user IDs coupled with the voice recognition results. The control of the forms of the images is not limited to changes in characters, and characters may be changed into raised letters. For example, the CPU 102 controls the image forming unit 112 to deposit ink so as to form raised letters.

The process of creating minutes data is as described above. The description returns to FIG. 3.

The CPU 102 controls the image processing unit 116 to create printing data based on the created minutes data. The CPU 102 controls the sheet feeding unit 114 to feed a sheet and controls the image forming unit 112 to form an image on the sheet based on the printing data (ACT 118).

The image forming apparatus 100 according to the embodiment presents information to an attendee to request printing authorization before printing minutes. For example, the CPU 102 displays an image "Do you want to print minutes?" on the display device of the operation unit 110. The CPU 102 executes the printing of minutes when the operation unit 110 is manipulated to authorize the printing of minutes.

Further, the CPU 102 may store the minutes data in a storage device provided outside the image forming apparatus 100. For example, the CPU 102 stores the minutes data in an external server connected through the external network. The CPU 102 downloads the minutes data from the external server when the operation unit 110 is manipulated to print the minutes data stored in the external server. As a result, as desired by the user, the CPU 102 can control the image forming unit 112 to print the minutes data.

In addition, the image forming apparatus 100 according to the embodiment may select whether to store the minutes data of the minute in the storage unit 118 or erase the minutes data after the image forming unit 112 prints the minutes data. At this time, the image forming apparatus 100 displays an image "Do you want to store the printing data" on the display device of the operation unit 110 such that the user can select whether to store or erase the data. The CPU 102 erases the minutes data and the printing data from the storage unit 118 when the operation unit 110 is manipulated to erase the data. The CPU 102 stores the minutes data and the printing data in a storage region of the storage unit 118 when the operation unit 110 is manipulated to store the data. At this time, the CPU 102 may add date information to the minutes data or the printing data. In addition, the CPU 102 may set the minutes data to be a text format and may set a file name thereof to be continuous to a file name of another minutes data.

The CPU 102 determines whether or not the minutes taking mode ends (ACT 120). When it is determined that the operation unit 110 is manipulated to end the minutes taking mode (ACT 120: YES), the CPU 102 ends the process. When it is determined that the operation unit 110 is not manipulated to end the minutes taking mode (ACT 120: NO), the CPU 102 returns the process to ACT 102.

The CPU 102 repeats the processes ACT 102 to ACT 120. As a result, the CPU 102 repeatedly transmits non-transmitted voice data at each transmission timing. The CPU 102 repeatedly executes the following operations of receiving the voice recognition results, creating the minutes data, and printing minutes.

According to at least one of the above-described embodiments, the image forming apparatus 100 inputs voice signals, transmits a non-transmitted voice signal to the voice recognition apparatus 200 when a predetermined condition is satisfied, and prints minutes based on the voice recognition results. As a result, according to the embodiment, minutes can be automatically printed without performing a troublesome work. That is, in the image forming apparatus 100 according to the embodiment, the image forming unit 112 prints minutes on a sheet at the printing timing. As a result, the image forming apparatus 100 can assist a meeting or take minutes thereof in real time.

The functions of the CPU 102 according to the embodiment may be realized by a computer. In this case, a program for realizing the functions is recorded on a computer-readable recording medium. The function may be realized by causing a computer system to read and execute the program recorded on the recording medium. "Computer system" described herein includes OS and hardware such as peripheral devices. In addition, "computer-readable recording medium" is a recording device such as a flexible disc. The recording device may be a portable medium such as a magneto-optic disc, ROM, or CD-ROM; or a hard disc drive built into the computer system. Further, "computer-readable recording medium" may be a communication line. In addition, "computer-readable recording medium" may include a non-volatile memory built into the computer system. In addition, the program may realize a part of the above-described functions. Further, the program may realize the above-described functions in combination with another program previously stored in the computer system.

While certain embodiments have been described, these embodiments have been presented by way of example only, and are not intended to limit the scope of the inventions. Indeed, the novel embodiments described herein may be embodied in a variety of other forms: furthermore various omissions, substitutions, and changes in the form of the embodiments described herein may be made without departing from the spirit of the inventions. The accompanying claims and their equivalents are intended to cover such forms or modifications as would fall within the scope and spirit of the invention.

For example, in the description of the above-described embodiment, minutes are taken. However, the image forming apparatus 100 may be connected to a telephone line so as to input a voice transmitted from the telephone line. As a result, the image forming apparatus 100 according to the embodiment can take a memo of the details of a telephone conversation. Further, the image forming apparatus 100 according to the embodiment may receive data transmitted through voice communication so as to print the details of a voice.

What is claimed is:

1. A minutes taking system comprising:
a voice recognition apparatus; and
an image forming apparatus,
wherein the voice recognition apparatus receives voice signals from the image forming apparatus, performs voice recognition processing on the received voice signals, and returns voice recognition results to the image forming apparatus, and
the image forming apparatus includes:
voice input units configured to input voice signals,
a storage unit configured to accumulate the voice signals input from the voice input units,
a voice transmission unit configured to transmit a non-transmitted voice signal, among the voice signals stored in the storage unit, to the voice recognition apparatus when a predetermined condition is satisfied,
a voice recognition result receiving unit configured to receive the voice recognition results returned by the voice recognition apparatus,
a minutes data creating unit configured to create minutes data based on the voice recognition result received by the voice recognition result receiving unit,
wherein the minutes data creating unit creates the minutes data in which the voice recognition results are arranged in chronological order, and line break information is inserted between the respective voice recognition results, and
an image forming unit configured to form an image, which represents details of minutes, on a sheet based on the minutes data created by the minutes data creating unit.

2. The system according to claim 1,
wherein the image forming apparatus further includes a frequency detecting unit configured to detect center frequencies of the voice signals input by the voice input units, and
the voice transmission unit repeatedly transmits the non-transmitted voice signal multiple times when the predetermined condition is satisfied, the predetermined condition being a change of the center frequencies of the voice signals detected by the frequency detecting unit.

3. The system according to claim 2,
wherein the image forming apparatus further includes an identification information registering unit configured to register identification information of attendees coupled with center frequencies of voices, and the minutes data creating unit couples the voice recognition results with the identification information, which is registered by the identification information registering unit, based on the center frequencies detected by the frequency detecting unit.

4. The system according to claim 3,
wherein the minutes data creating unit controls the image forming unit to control forms of images, which are formed on the sheet, based on the identification information coupled with the voice recognition results.

5. The system according to claim 1,
the voice transmission unit repeatedly transmits the non-transmitted voice signal multiple times when the predetermined condition is satisfied, the predetermined condition being an elapsing of a predetermined period during which the voice signals input by the voice input units contain no voices of the attendees.

6. The system according to claim 1,
wherein when a voice recognition result containing a predetermined character string is present, the minutes data creating unit excludes the voice recognition result containing the predetermined character string from the minutes data.

7. The system according to claim 1,
wherein the minutes data creating unit extracts a voice recognition result containing selected information from the voice recognition results to create summary information and creates the minutes data based on the summary information.

8. A minutes taking system comprising:
a voice recognition apparatus; and
an image forming apparatus,
wherein the voice recognition apparatus receives voice signals from the image forming apparatus, performs voice recognition processing on the received voice signals, and returns voice recognition results to the image forming apparatus, and
the image forming apparatus includes:
voice input units configured to input voice signals,
a storage unit configured to accumulate the voice signals input from the voice input units,
a voice transmission unit configured to transmit a non-transmitted voice signal, among the voice signals stored in the storage unit, to the voice recognition apparatus when a predetermined condition is satisfied,
a voice recognition result receiving unit configured to receive the voice recognition results returned by the voice recognition apparatus,
a minutes data creating unit configured to create minutes data based on the voice recognition result received by the voice recognition result receiving unit,
wherein when a voice recognition result containing a predetermined character string is present, the minutes data creating unit excludes the voice recognition result containing the predetermined character string from the minutes data, and
an image forming unit configured to form an image, which represents details of minutes, on a sheet based on the minutes data created by the minutes data creating unit.

9. The system according to claim 8,
wherein the image forming apparatus further includes a frequency detecting unit configured to detect center frequencies of the voice signals input by the voice input units, and
the voice transmission unit repeatedly transmits the non-transmitted voice signal multiple times when the predetermined condition is satisfied, the predetermined condition being a change of the center frequencies of the voice signals detected by the frequency detecting unit.

10. The system according to claim 9,
wherein the image forming apparatus further includes an identification information registering unit configured to register identification information of attendees coupled with center frequencies of voices, and
the minutes data creating unit couples the voice recognition results with the identification information, which is registered by the identification information registering unit, based on the center frequencies detected by the frequency detecting unit.

11. The system according to claim 10,
wherein the minutes data creating unit controls the image forming unit to control forms of images, which are formed on the sheet, based on the identification information coupled with the voice recognition results.

12. The system according to claim 8,
the voice transmission unit repeatedly transmits the non-transmitted voice signal multiple times when the predetermined condition is satisfied, the predetermined condition being an elapsing of a predetermined period during which the voice signals input by the voice input units contain no voices of the attendees.

13. The system according to claim 8,
wherein the minutes data creating unit extracts a voice recognition result containing selected information from the voice recognition results to create summary information and creates the minutes data based on the summary information.

* * * * *